May 22, 1962  K. E. ERICSSON  3,035,632
GAS TORCH FOR WELDING OF PLASTIC MATERIALS
Filed Nov. 4, 1958

Inventor
KARL ERIC ERICSSON

# United States Patent Office 3,035,632
Patented May 22, 1962

3,035,632
GAS TORCH FOR WELDING OF PLASTIC
MATERIALS
Karl Eric Ericsson, Sundbyberg, Sweden, assignor to Aktiebolaget Max Sievert, Sundbyberg, Sweden, a corporation of Sweden
Filed Nov. 4, 1958, Ser. No. 771,814
Claims priority, application Sweden Nov. 12, 1957
4 Claims. (Cl. 158—27.4)

This invention relates to a gas torch for welding plastic materials such as sheets or tubes of a synthetic thermoplastic resin. More particularly the invention relates to a gas torch for welding of plastic materials, said torch comprising a mixing chamber opening into a combustion chamber provided with apertures for ignition of the gas and a nozzle extending from said combustion chamber as an outlet for the gases of combustion produced therein.

As the gas flame must not directly touch the plastic material, the gas flame and the orifice of the nozzle for the combustion gases in such torches are spaced relatively remote from each other, and the combustion chamber must be closed, when the torch is in operation, in order to create the positive pressure necessary for accelerating the flow of the combustion gases from the nozzle. These features complicate the ignition of the gas flame when the torch is to be ignited.

One main object of the present invention is to provide a gas torch of the type specified embodying means adapted to eliminate the deficiencies mentioned hereinbefore and inherent in gas torches as hitherto known.

A further object of the invention is to provide a gas torch of the type specified incorporating means adapted to facilitate the ignition of the gas without reducing the reliability and safety of the torch when in operation.

A still further object of the invention is to provide a gas torch of the type specified, which is simple and cheap in manufacture and easy and convenient to use.

Further objects and advantages of the invention will become apparent from the following specification, considered in connection with the accompanying drawing, which forms part of this specification and in which.

Figure 1:
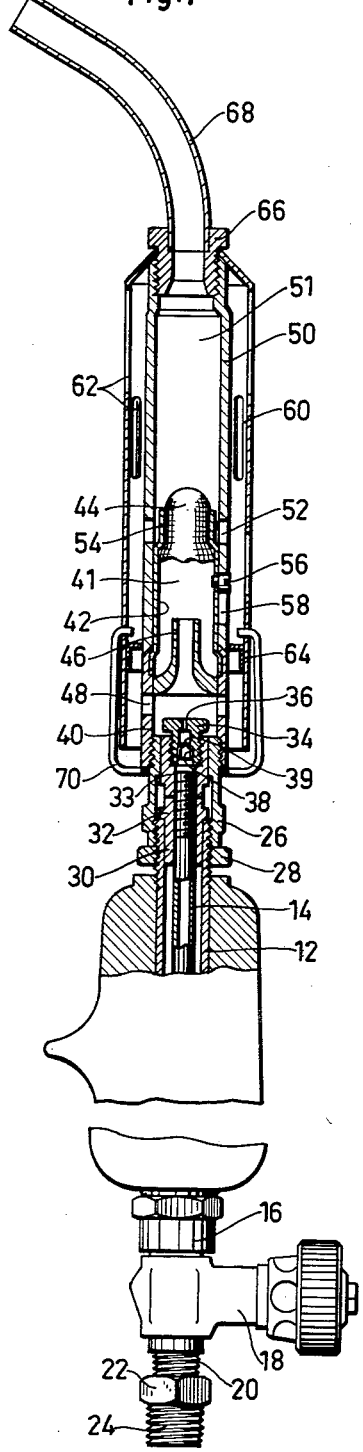
FIG. 1 is a longitudinal sectional view of a gas torch embodying the invention.

Referring to the drawing, reference numeral 10 designates a handle having a longitudinal bore enclosing a bushing 12. A tube 14, which is freely rotatable in relation to the handle, and which at the rear end of the handle is connected by means of a threaded connection 16 to the casing of a valve which suitably is formed as a needle valve 18, passes through said bushing 12. The inlet member 20 of the valve carries a sleeve nut 22 having an external thread 24 for connection with a coupling member, not shown in the drawing, of a gas supply hose. A sleeve 26 is screwed onto the end of the bushing 12 opposite said valve and is adapted to be locked in various axial positions by means of a locking nut 28. Rotatable within said sleeve 26 and secured by thread connection to the tube 14 is a guide bushing 30 which by a flange 32 engages the outer edge of the bushing 12 in order to fix the axial position of the tube 14 in relation to the handle 10. Coaxially with said guide bushing 30 a further bushing 33 is screwed onto the tube 14. Said bushing 33 is also located within the sleeve 26 and serves as a retainer for a gas supply nozzle 34. Nozzle 34 is provided with a gas feed opening 36 and is screwed into the bushing 33. Nozzle 34 carries a cup-shaped element 38 provided with an internal fine gas metering orifice 39 communicating with the gas feed opening 36 of the nozzle.

A tube 40 is screwed at one end into the bushing 33. Another tube 42 having an outer end portion 54 of reduced diameter is press-fitted into the tube 40, and the outer end of this latter tube is closed by a cup-shaped wire net 44. A mixing tube 46 is spaced from and aligned with the opening in nozzle 34 and a ring of apertures 48 is formed in the tube 40 axially between the nozzle and the mixing tube. Gas flowing through the opening 36 in nozzle 34 draws in air through the apertures 48 and the mixture passes through tube 46 into a further mixing chamber 41. Said chamber is defined by the tube 42 and the wire net 44. The spacing between the nozzle 34 and the tube 46 may be adjusted by loosening the locking nut 28 and subsequently screwing of the sleeve 26 on the bushing 12 in one direction or the other. The sleeve is then locked again by means of the locking nut.

Figure 2:
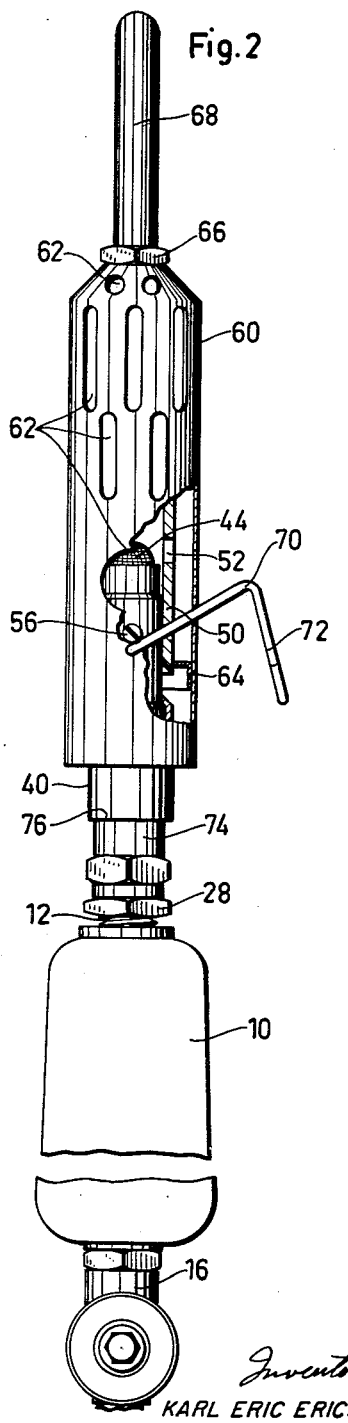
FIG. 2 is a top plan view of the torch shown in FIG. 1, with a portion of a cover jacket component of the torch cut away, and with movable parts in different relative axial positions than those shown in FIG. 1.

Mounted on the external surface of the tube 42 is another tube 50 which forms a combustion chamber 51 by having a wall portion projecting ahead of the cup-shaped flame arresting net 44. For igniting the gas discharged through the net cup 44 from the mixing tube 46, the tube 50 is provided with circumferentially disposed spaced apertures 52 located outside the outer end portion 54 of the tube 42 when tube 50 is in one of its end positions. This end portion thus covers the said apertures 52 in the position shown in FIG. 1 which position represents the operative position of the torch. In the position shown in FIG. 2, the position for ignition of the torch, the tube 50 is moved down, the apertures 52 thus being moved to a position adjacent the net cup 44 permitting the gas upon discharge to be ignited by a flame brought to the holes. The positions of the tubes 42 and 50 relative to one another are limited by means of a screw 56 screwed into the wall of the tube 42 and adapted to slide in an elongated aperture 58 extending in the tube in axial direction.

The combustion chamber tube 50 carries on its external surface a cover jacket 60 provided with a plurality of openings 62, one of which is situated directly in front of the circumferentially disposed apertures 52 of the tube. Said jacket 60 is held in a predetermined position in relation to the tube 50 by means of a collar 64 provided at the inner end of the tube 50 and a nipple 66 screwed into the front end of the tube 50 for connecting an exhaust nozzle 68 extending from such end.

As the screw 56 merely limits the displacement of the tubes 42 and 50 relative to each other, a locking device is disposed between these elements, which in the embodiment illustrated comprises a wire loop 70 pivotably connected to the cover jacket 60 and having an intermediate portion 72 provided between its legs and adapted to be snapped onto a part 74 of the sleeve 26 located outside the cover jacket. In the position shown in FIG. 1, a locking effect is obtained by the wire loop engaging a shoulder 76 formed between the sleeve 26 and the rear While one more or less specific embodiments of the invention has been shown and described, it is to be understood that this is for purpose of illustration only and that the invention is not to be limited thereby, but its scope is to be determined by the appended claims.

What I claim is:

1. A gas torch for producing hot products of combustion from gaseous fuel under pressure comprising means providing a fuel mixing chamber, nozzle means for admitting gaseous fuel under pressure to said chamber, means forming air aspirating inlet openings for induction of combustion air into said mixing chamber due to flow of said fuel flowing under pressure from said nozzle means, means providing a combustion chamber communicating with said mixing chamber, means for moving said combustion chamber relative to said mixing chamber, said combustion chamber means being movable relative to said mixing chamber means from an operative position to an ignition position and said combustion chamber means being provided with an ignition aperture located to be accessible for the insertion of an igniting element into the combustion chamber when the combustion chamber means is in ignition position and said aperture being located to be substantially masked when said combustion chamber means is in operative position.

2. A torch as defined in claim 1, in which a mixing tube of reduced diameter is located in said mixing chamber between said nozzle means and said combustion chamber to act as an injector for drawing combustion air into the device.

3. A torch as defined in claim 1, in which said ignition aperture is masked by a portion of said mixing chamber means when said combustion chamber means is in operative position.

4. A torch as defined in claim 1, in which said mixing chamber and said combustion chamber are separated by a flame-arresting screen.

References Cited in the file of this patent

UNITED STATES PATENTS

| | | |
|---|---|---|
| 1,515,172 | Ronstrom | Nov. 11, 1924 |
| 1,791,565 | Killam | Feb. 10, 1931 |
| 1,851,871 | Salisbury | Mar. 29, 1932 |
| 2,720,257 | Lynes | Oct. 11, 1955 |

FOREIGN PATENTS

| | | |
|---|---|---|
| 765,896 | France | June 18, 1934 |

UNITED STATES PATENT OFFICE
CERTIFICATE OF CORRECTION

Patent No. 3,035,632                                  May 22, 1962

Karl Eric Ericsson

It is hereby certified that error appears in the above numbered patent requiring correction and that the said Letters Patent should read as corrected below.

Column 2, line 57, after "rear" insert -- edge of the tube 40. --.

Signed and sealed this 2nd day of October 1962.

(SEAL)
Attest:

ERNEST W. SWIDER                                  DAVID L. LADD
Attesting Officer                                      Commissioner of Patents